US009921371B2

(12) United States Patent
Miyasaka et al.

(10) Patent No.: US 9,921,371 B2
(45) Date of Patent: Mar. 20, 2018

(54) LIGHT GUIDE ELEMENT AND IMAGE DISPLAY DEVICE

(71) Applicant: Asahi Glass Company, Limited, Chiyoda-ku (JP)

(72) Inventors: Koji Miyasaka, Tokyo (JP); Yukihiro Tao, Tokyo (JP); Kosuke Takayama, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/234,102

(22) Filed: Aug. 11, 2016

(65) Prior Publication Data
US 2016/0349517 A1    Dec. 1, 2016

Related U.S. Application Data

(63) Continuation of application No. PCT/JP2015/054350, filed on Feb. 17, 2015.

(30) Foreign Application Priority Data

Feb. 21, 2014    (JP) .................................. 2014-032260

(51) Int. Cl.

| G02B 6/34 | (2006.01) |
|---|---|
| G02B 6/124 | (2006.01) |
| G02B 6/293 | (2006.01) |
| G02B 27/42 | (2006.01) |
| F21V 8/00 | (2006.01) |
| G02B 5/30 | (2006.01) |
| G02B 5/18 | (2006.01) |
| G02B 27/01 | (2006.01) |
| G02B 6/00 | (2006.01) |

(52) U.S. Cl.
CPC ............ *G02B 6/34* (2013.01); *G02B 5/3016* (2013.01); *G02B 6/0036* (2013.01); *G02B 6/124* (2013.01);

(Continued)

(58) Field of Classification Search
None
See application file for complete search history.

(56) References Cited

U.S. PATENT DOCUMENTS

| 6,775,065 B2 | 8/2004 | Hayashi et al. |
| 7,619,795 B2 | 11/2009 | Masuda |

(Continued)

FOREIGN PATENT DOCUMENTS

| JP | 2001-324731 | 11/2001 |
| JP | 2002-116314 | 4/2002 |

(Continued)

OTHER PUBLICATIONS

International Search Report dated Apr. 14, 2015 in PCT/JP2015/054350, filed on Feb. 17, 2015 ( with English Translation).

(Continued)

*Primary Examiner* — Jerry Rahll
(74) *Attorney, Agent, or Firm* — Oblon, McClelland, Maier & Neustadt, L.L.P.

(57) ABSTRACT

A light guide element includes a light-guiding substrate and a diffraction part formed on a surface of the light-guiding substrate. The diffraction part includes an optical layer capable of exerting a diffractive action. The distance from the light-guiding substrate to a surface of the optical layer is equal to or less than 10% of a thickness of the light-guiding substrate. The light guide element satisfies |ΔD|≤0.15 mm, where ΔD is an amount of a change in D with the temperature change ΔT, D [mm] is a distance, at the temperature T (° C.), between the center of the diffraction part and a position predetermined as a position where the ray of light comes out of the light-guiding substrate in a direction horizontal with respect to the light-guiding substrate, and ΔT is a temperature change.

20 Claims, 8 Drawing Sheets

(52) U.S. Cl.
CPC ..... *G02B 6/29301* (2013.01); *G02B 6/29304* (2013.01); *G02B 27/4261* (2013.01); *G02B 5/18* (2013.01); *G02B 6/00* (2013.01); *G02B 6/0035* (2013.01); *G02B 27/0103* (2013.01); *G02B 27/0172* (2013.01); *G02B 2027/0118* (2013.01); *G02B 2027/0174* (2013.01)

(56) References Cited

U.S. PATENT DOCUMENTS

| | | |
|---|---|---|
| 2002/0060846 A1 | 5/2002 | Hayashi et al. |
| 2009/0153930 A1 | 6/2009 | Masuda |
| 2013/0250380 A1 | 9/2013 | Fujikawa et al. |

FOREIGN PATENT DOCUMENTS

| | | |
|---|---|---|
| JP | 2003-140081 | 5/2003 |
| JP | 4238600 | 3/2009 |
| JP | 2010-243787 | 10/2010 |
| JP | 5151443 | 2/2013 |
| JP | 2013-200467 | 10/2013 |

OTHER PUBLICATIONS

Written Opinion dated Apr. 14, 2015 in PCT/JP2015/054350, filed on Feb. 17, 2015.

LIGHT GUIDE ELEMENT AND IMAGE DISPLAY DEVICE

TECHNICAL FIELD

The present invention relates to a light guide element in which light that is deflected by the diffractive action of a diffraction part formed on a substrate and is then emitted into the substrate is guided along a given optical path, or relates to an image display device including the light guide element.

BACKGROUND ART

Technics for head-mounted display devices (hereinafter referred to as HMDs) in which a holographic element or a diffractive optical element is used are existed. In the HMD, image light emitted from a liquid-crystal device or the like is guided along a given optical path using a light guide element, such as that described above, so as to be viewed by the user.

For example, Patent Document 1 describes an example of HMDs which employs a reflective volume holographic element. Patent Document 2 describes an example of HMDs which has been configured so that an image displayed on a display element is optically enlarged to form an enlarged virtual image, which is viewed by the user. In Patent Document 2 is further shown an example in which in order to widen the viewing angle of the virtual image which is the image to be viewed by the user, the light guide member is constituted of a glass material having a refractive index for the wavelength of the image of 1.6 or higher.

As techniques relevant to the present invention, techniques for reducing the temperature dependence of diffraction angle are described in Patent Documents 3 to 5.

PRIOR ART DOCUMENTS

Patent Documents

Patent Document 1: JP-A-2013-200467
Patent Document 2: JP-A-2010-243787
Patent Document 3: JP-A-2002-116314
Patent Document 4: Japanese Patent No. 5151443
Patent Document 5: Japanese Patent No. 4238600

SUMMARY OF THE INVENTION

Problems that the Invention is to Solve

In general, in optical elements in which the phenomenon of diffraction is utilized, the angle of diffraction changes with changes in pitch or with changes in refractive index. In case where such changes in diffraction angle occur after completion of a product, the optical system suffers a shift of the optical axis or incidence angle. In the case of a device in which images are propagated, such a shift can be deterioration in image. In particular, in the case of a device including a light guide element which propagates light while utilizing total reflection within the substrate, such as an HMD, even a slight change in diffraction angle is prone to result in deterioration in image due to the shift of the optical path.

A cause of changes in pitch or refractive index which affect the angle of diffraction is thought to be temperature changes. However, such changes in diffraction angle due to temperature changes are not taken into account at all in Patent Document 1 and Patent Document 2.

Meanwhile, Patent Documents 3 to 5 indicate that the angle of diffraction changes with changing temperature. However, the techniques described in Patent Document 3 and Patent Document 4 are ones which are intended to offset fluctuations in diffraction angle due to fluctuations in laser-light wavelength which accompany changes in ambient temperature by fluctuations in diffraction angle due to the thermal expansion of the diffractive optical element, and are not ones which are intended to diminish the fluctuations in diffraction angle due to the thermal expansion of the diffractive optical element. For example, in the light scanning devices described in Patent Document 3 and Patent Document 4, a resin having a higher coefficient of linear expansion than glasses is used as the material of the diffractive optical element to thereby purposely cause the diffractive optical element to fluctuate in diffraction angle due to the thermal expansion thereof. In such methods, it is impossible to configure a diffractive optical element which by itself diminishes the deterioration in image quality that accompanies temperature changes. In addition, designs for such a diffractive optical element depend on the performance of the laser, and the element is applicable in limited uses.

Patent Document 3 describes that in a case where the diffractive optical element is constituted of an inorganic material reduced in thermal strain, fluctuations in the lattice pitch of the diffraction grating surface due to thermal deformations can be ignored. However, there is no further description thereon in the Patent Document, and what degree of linear expansion coefficient renders the fluctuations in the light guide element ignorable is not taken into account. Moreover, not only the thermal strain of the diffractive optical element but also the thermal strain of the light-guiding substrate into which diffracted light from the diffractive optical element is emitted, changes in the refractive index of the light-guiding substrate, etc. are not taken into account therein at all.

Furthermore, the technique described in Patent Document 5 also is one which is intended to balance fluctuations in wavelength separation characteristics due to changes in the pitch of the diffraction grating that thermally expands or contracts with temperature changes, by changes in the refractive index of a prism part. This technique hence is not applicable to diffraction gratings which employ parallel flat plates and include no prism part. Patent Document 5 describes a method in which the amount of movement of the convergence spot is offset by the amount of movement of the diffraction grating substrate due to thermal expansion/contraction. However, it is difficult to practice this method in which the distance between the center of the diffraction grating (the position where the main light ray from the optical fiber strikes) and the position of each groove part is set so that the degree of movement of the convergence spot is substantially equal to the degree of movement of the diffraction grating substrate due to thermal expansion/contraction and in which the diffraction grating substrate is fixed to a fixing frame so that the diffraction grating substrate moves to the direction opposite to a direction in which the spot moves upon a temperature change. Namely, the movements of the spot cannot be always offset at various temperatures, and it is extremely difficult to precisely perform such positioning.

As described above, the changes which occur in light guide elements with changing temperature are not limited to changes in pitch or refractive index due to thermal strains of the diffractive optical element, and examples thereof further include changes in emission position and changes in refractive index which occur due to thermal strains of the light-guiding substrate into which diffracted light from the diffractive optical element is emitted. However, the techniques described in Patent Documents 1 to 5 are not ones in which such changes are collectively taken into account in order to discover conditions under which shifts of the optical axis due to temperature changes are within a permissible range.

An object of the present invention is to provide a light guide element and an image display device in each of which quality deteriorations due to temperature changes can be inhibited by a simple configuration.

Means for Solving the Problems

The light guide element in the present invention includes a light-guiding substrate and a diffraction part formed on a surface of the light-guiding substrate, and the diffraction part includes an optical layer capable of exerting a diffractive action, a distance from the light-guiding substrate to a surface of the optical layer is equal to or less than 10% of a thickness of the light-guiding substrate, and the light guide element satisfies $|\Delta D|=|D\Delta T/\cos^2\theta \times (\alpha+\beta/n)|\leq 0.15$ mm, wherein $\theta$ is an angle formed by a direction normal to the light-guiding substrate and a ray of light that is diffracted by the diffraction part and is propagated in the light-guiding substrate, T (° C.) is a temperature, D [mm] is a distance, at the temperature T, between the center of the diffraction part and a position predetermined as a position where the ray of light comes out of the light-guiding substrate in a direction horizontal with respect to the light-guiding substrate, n is a refractive index of the light-guiding substrate at a wavelength used, $\alpha$ [1/° C.] is a coefficient of linear expansion of the light-guiding substrate, $\beta$ [1/° C.] is a temperature coefficient of the refractive index of the light-guiding substrate, $\Delta T$ is a temperature change, and $\Delta D$ is an amount of a change in D with the temperature change $\Delta T$.

The light guide element may be constituted such that $|\Delta D|\leq 0.1$ mm is satisfied. Or, the light guide element may be constituted such that $|\Delta D|\leq 0.05$ mm is satisfied.

In addition, the light guide element in the present invention may be constituted by including a light-guiding substrate and a diffraction part formed on a surface of the light-guiding substrate, in which the diffraction part includes an optical layer capable of exerting a diffractive action, a distance from the light-guiding substrate to a surface of the optical layer is equal to or less than 10% of a thickness of the light-guiding substrate, the light-guiding substrate is a glass substrate, and the light-guiding substrate satisfies $|\alpha+\beta/n|\leq 9\times 10^{-6}$, wherein n is a refractive index of the light-guiding substrate at a wavelength used, $\alpha$ [1/° C.] is a coefficient of linear expansion of the light-guiding substrate, and $\beta$ [1/° C.] is a temperature coefficient of the refractive index of the light-guiding substrate.

The light guide element may be constituted such that $\alpha \leq 0.7 \times 10^{-6}$ is further satisfied.

The light guide element may be constituted such that $|\alpha+\beta/n|\leq 8\times 10^{-6}$ is satisfied.

The light guide element may be constituted such that $1.5\leq n \leq 2.0$ is further satisfied.

In addition, the light guide element in the present invention may be constituted by including a light-guiding substrate and a diffraction part formed on a surface of the light-guiding substrate, in which the diffraction part includes an optical layer capable of exerting a diffractive action, a distance from the light-guiding substrate to a surface of the optical layer is equal to or less than 10% of a thickness of the light-guiding substrate, the light-guiding substrate is a glass substrate, and when a refractive index for d-line of the light-guiding substrate at an average temperature in a use environment is expressed by $n_d$ and Abbe number for d-line of the light-guiding substrate at the average temperature in the use environment is expressed by $v_d$, the light-guiding substrate satisfies any of the requirements shown as the following group (A) or any of the requirements shown as the following group (B):

Group (A):

$1.65\leq n_d \leq 1.75$ (where $55 \leq v_d \leq 60$), $-0.005v_d+1.925\leq n_d \leq 1.75$ (where $50 \leq v_d \leq 55$), $1.75\leq n_d \leq 1.80$ (where $30 \leq v_d \leq 35$), $-0.005v_d+1.925\leq n_d \leq 1.80$ (where $35 \leq v_d \leq 40$), $-0.005v_d+1.925\leq n_d \leq -0.005v_d+2.00$ (where $40 \leq v_d \leq 50$), $v_d \leq 30$, $1.60\leq n_d \leq 1.65$ (where $62 \leq v_d \leq 70$), $1.60\leq n_d \leq 1.65$ (where $55 \leq v_d \leq 62$), $1.60\leq n_d \leq -0.005v_d+1.925$ (where $50 \leq v_d \leq 55$), $1.54\leq n_d \leq 1.60$ (where $v_d \leq 50$).

Group (B):

$-0.005v_d+2.00\leq n_d$ (where $40 \leq v_d \leq 50$), $n_d \geq 1.80$ (where $30 \leq v_d \leq 40$), $n_d \geq 1.95$ (where $26 \leq v_d \leq 30$), $1.65\leq n_d \leq 1.91$ (where $24 \leq v_d \leq 40$), $1.75\leq n_d \leq -0.005v_d+1.925$ (where $36 \leq v_d \leq 50$), $-0.01333v_d+2.13\leq n_d \leq -0.005v_d+1.925$ (where $35 \leq v_d \leq 36$), $-0.01333v_d+2.13\leq n_d \leq 1.75$ (where $30 \leq v_d \leq 35$).

The light guide element may be constituted such that $v_d>30$ is further satisfied.

In addition, the image display device in the present invention includes any one of the above light guide elements.

Effects of the Invention

In the present invention, quality deteriorations due to temperature changes can be inhibited by a simple configuration.

MODES FOR CARRYING OUT THE INVENTION

Figure 1:
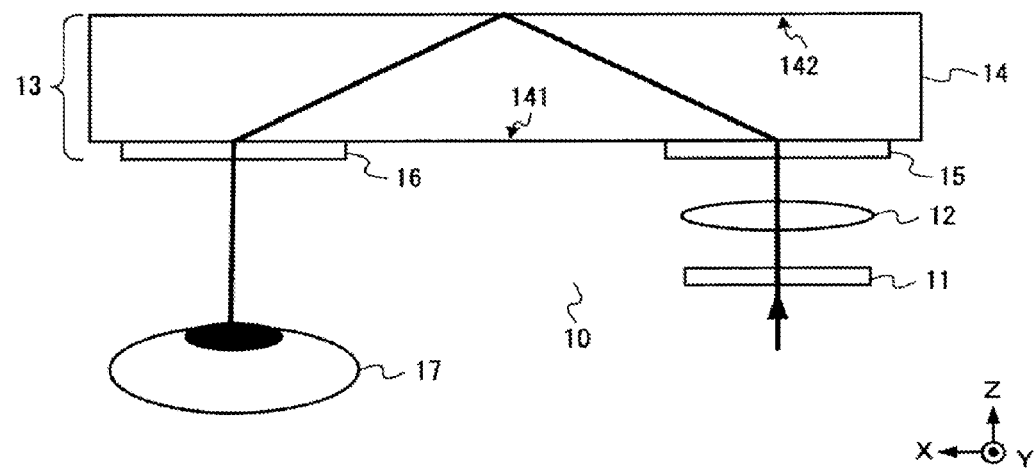
FIG. 1 is a schematic view of an image display device 10 according to a first embodiment.

Embodiments of the present invention are explained below by reference to the drawings. FIG. 1 is a schematic view of an image display device 10 according to a first embodiment of the present invention. The image display device 10 shown in FIG. 1 includes an image light formation part 11, a lens 12, and a light guide element 13. The light guide element 13 includes a light-guiding substrate 14 and a diffraction part 15 and a diffraction part 16 which have been formed on the light-guiding substrate 14. Reference numeral 17 denotes a viewer.

In the image display device 10 shown in FIG. 1, image light from the image light formation part 11 is propagated along a given optical path, i.e., an optical path through which the image light is viewed by the viewer 17, by means of the lens 12 and the light guide element 13. Specifically, the image light emitted from the image light formation part 11 enters the diffraction part 15 of the light guide element 13 via the lens 12. The image light which has entered the diffraction part 15 is deflected by the diffractive action of the diffraction part 15 and enters the light-guiding substrate 14. The image light which has entered the light-guiding substrate 14 repeatedly undergoes total reflection within the light-guiding substrate 14 and enters the diffraction part 16. The image light which has entered the diffraction part 16 is deflected by the diffractive action of the diffraction part 16 and, as a result, comes to be viewed by the viewer 17. Hereinafter, the diffraction part disposed at the position where the light enters the light guide element 13 (the diffraction part 15 in this example) is often called a diffraction part for incidence, and the diffraction part disposed at the position where the light is emitted from the light guide element 13 (the diffraction part 16 in this example) is often called a diffraction part for emission.

The image display device 10 may include components such as an electronic circuit and a power supply besides the components shown above, although such components are omitted in FIG. 1.

The diffraction part for incidence 15 and the diffraction part for emission 16 may have the function of a lens or the function of a lens array besides the function of deflecting light. In the case where the function of a lens has been imparted thereto, an image formed from the image light can be optically enlarged. Meanwhile, in the case where the function of a lens array has been imparted, it is possible to give depth information to the image formed from the image light or to regulate the position where the image is formed.

The diffraction part for incidence 15 and the diffraction part for emission 16 are not particularly limited in the specific configuration thereof, so long as the diffraction parts each have been configured so as to exert the desired diffractive action. For example, the diffraction parts 15 and 16 each may be a diffractive optical element which exerts a diffractive action on the basis of periodic convex and concave, or may be a volume holographic element which exerts a diffractive action on the basis of refractive-index modulation.

The surface on which the diffraction part for incidence 15 and the diffraction part for emission 16 are to be formed is not limited to the first optical surface (the optical surface on the side where image light first enters the light-guiding substrate 14) 141 of the light-guiding substrate 14, as shown in FIG. 1, and may be the second optical surface 142, which is the surface of the light-guiding substrate 14 that is on the reverse side from the first optical surface 141. It is also possible to form either of the diffraction parts 15 and 16 on the first optical surface 141 and form the other on the second optical surface 142. Furthermore, although the example shown in FIG. 1 is one in which the light guide element 13 includes one diffraction part for incidence 15 and one diffraction part for emission 16, the number of diffraction parts is not limited thereto. For example, the image display device may have a configuration in which the device includes only one diffraction part for incidence 15 or only one diffraction part for emission 16, or may have a configuration in which the device includes a plurality of diffraction parts for incidence 15 or a configuration in which the device includes a plurality of diffraction parts for emission 16. In the case where the image display device 10 includes a plurality of diffraction parts for incidence 15 or diffraction parts for emission 16, these diffraction parts may have been stacked at the same position on a surface of the light-guiding substrate 14.

In the example shown in FIG. 1, the first optical surface 141 serves both as an incidence surface and an emission surface. However, an incidence surface and an emission surface need not lie on the same surface.

Moreover, although the example shown in FIG. 1 is one in which the diffraction part for incidence 15 and the diffraction part for emission 16 are transmission type diffraction parts, the diffraction part for incidence 15 and the diffraction part for emission 16 may be of the reflection type.

Figure 2:
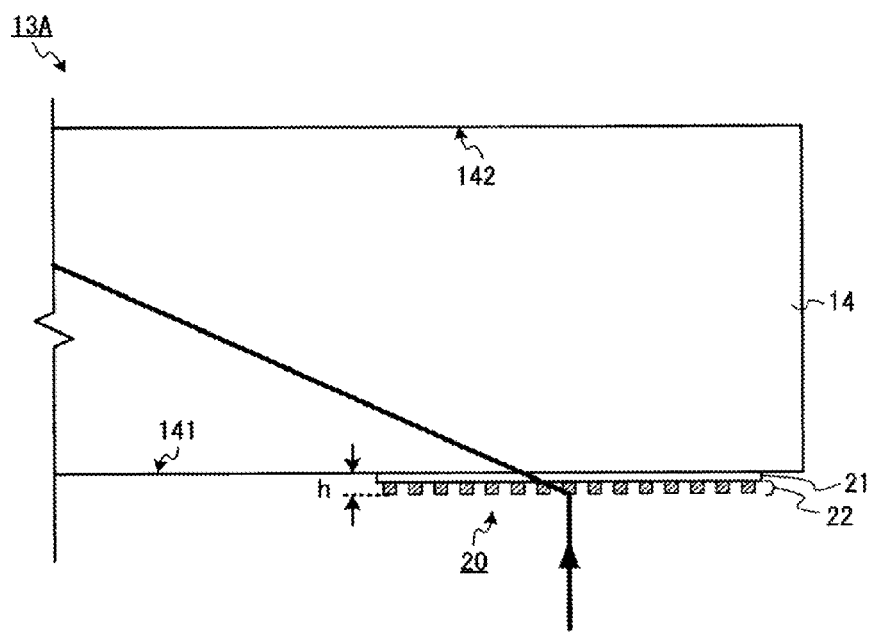
FIG. 2 is a view showing the configuration of a configuration example (light guide element 13A) of a light guide element 13.

FIG. 2 is a view which shows the configuration of a configuration example (light guide element 13A) of the light guide element 13. The light guide element 13A shown in FIG. 2 is an example in which at least one diffraction part has been formed using a diffractive optical element 20 which has a concavo-convex layer 22 that enables the diffractive optical element 20 to exert a diffractive action. As shown in FIG. 2, the light guide element 13A includes a light-guiding substrate 14 and at least one diffractive optical element 20. Although the example shown in FIG. 2 is one which includes a diffractive optical element 20 as a diffraction part for incidence 15, this light guide element 13A may further include another diffractive optical element (not shown) as a diffraction part for emission 16, for example, at another position on the first optical surface 141 of the light-guiding substrate 14 or at another position on the second optical surface 142. The diffraction part for incidence 15 and the diffraction part for emission 16 are not limited to diffractive optical elements 20, and each may be the volume holographic element 30 which will be described later.

The diffractive optical element 20 is formed on a surface of the light-guiding substrate 14. The concavo-convex layer 22, more specifically, is a layer having a convex and concave structure formed therein. The concavo-convex layer 22 may be formed using a resin, from the standpoint of ease of processing, or may be formed using another material. In other words, the concavo-convex layer 22 is not particularly limited so long as a structure generally called a diffraction grating has been formed therein to enable the concavo-convex layer 22 to exert a diffractive action.

In FIG. 2 is shown an example in which a base material 21 has been formed on a light-guiding substrate 14 and a concavo-convex layer 22 has been formed thereon. However, the base material 21 and the concavo-convex layer 22 may be the same member, that is, the concavo-convex layer 22 may be some of the base material 21. Furthermore, the base material 21 may be omitted by configuring the light-guiding substrate 14 so as to serve also as a base material 21. From the standpoint of enabling the thermal expansion of the concavo-convex layer 22 to be easily governed by the light-guiding substrate 14, it is preferable that the base material 21 should be a thin film substrate or be the same member as the concavo-convex layer 22 or should be omitted.

In the diffractive optical element 20, in a case where the distance between the light-guiding substrate 14 and the surface of the concavo-convex layer 22 of the diffractive optical element 20, more specifically, the distance from that surface of the light-guiding substrate 14 on which the diffractive optical element 20 has been formed to the tops of the protrusions in the concavo-convex layer 22 of the diffractive optical element 20, is expressed by h, then the distance h is preferably equal to or less than 10%, more preferably equal to or less than 5%, of the thickness of the light-guiding substrate 14. By thus configuring the light guide element, the thermal expansion of the concavo-convex layer 22 can be made equal to the thermal expansion of the light-guiding substrate 14. This is because so long as the distance h is sufficiently short as compared with the thickness of the light-guiding substrate 14, the thermal expansion of the light-guiding substrate 14 due to temperature changes is thought to be a factor which governs the thermal expansion of the concavo-convex layer 22. Meanwhile, the shape of the concavo-convex layer 22 can generally be determined from the required diffractive action through a calculation, etc., and there are cases where too small heights thereof result in a decrease in diffractive action. The height of the concavo-convex layer 22 hence is preferably 50 nm or larger, more preferably 100 nm or larger. Consequently, the distance (height) h also is preferably 50 nm or longer, more preferably 100 nm or longer.

An adhesive member, e.g., an adhesive, and an optical element having another optical function, e.g., a wave plate, may have been interposed between the light-guiding substrate 14 and the diffractive optical element 20, specifically, between the light-guiding substrate 14 and the base material 21 or between the light-guiding substrate 14 and the concavo-convex layer 22. In such cases also, it is preferable that the distance h should satisfy the requirement described above.

In the case where a diffractive optical element 20 is used as a diffraction part for incidence 15, it is necessary, for utilizing total reflection in the light-guiding substrate 14, that this diffractive optical element 20 should deflect light at a large angle. From this standpoint, it is preferable that the pitch, i.e., the interval between protrusions, in the concavo-convex layer 22 should be not longer than the wavelength of the light which enters the diffractive optical element 20. Also in the case where a diffractive optical element 20 is used as a diffraction part for emission 16 and where it is necessary that the incident light which has been propagated through the light-guiding substrate 14 while undergoing total reflection therein should be deflected at a large angle in order to guide the light along a given optical path, it is preferable that the pitch of the concavo-convex layer 22 of the diffractive optical element 20 as the diffraction part for emission 16 should be not longer than the wavelength of the light which enters the diffractive optical element 20.

In each diffractive optical element 20, the material, thickness, pitch, etc. of the concavo-convex layer 22 are regulated in accordance with the diffractive action which is desired to be exerted. In the case where a plurality of diffractive optical elements 20 is included, the distance h in each of all the diffractive optical elements 20 is preferably equal to or less than 10%, more preferably equal to or less than 5%, of the thickness of the light-guiding substrate 14. Furthermore, the distance (height h) also is preferably 50 nm or longer, more preferably 100 nm or longer.

Figure 3:
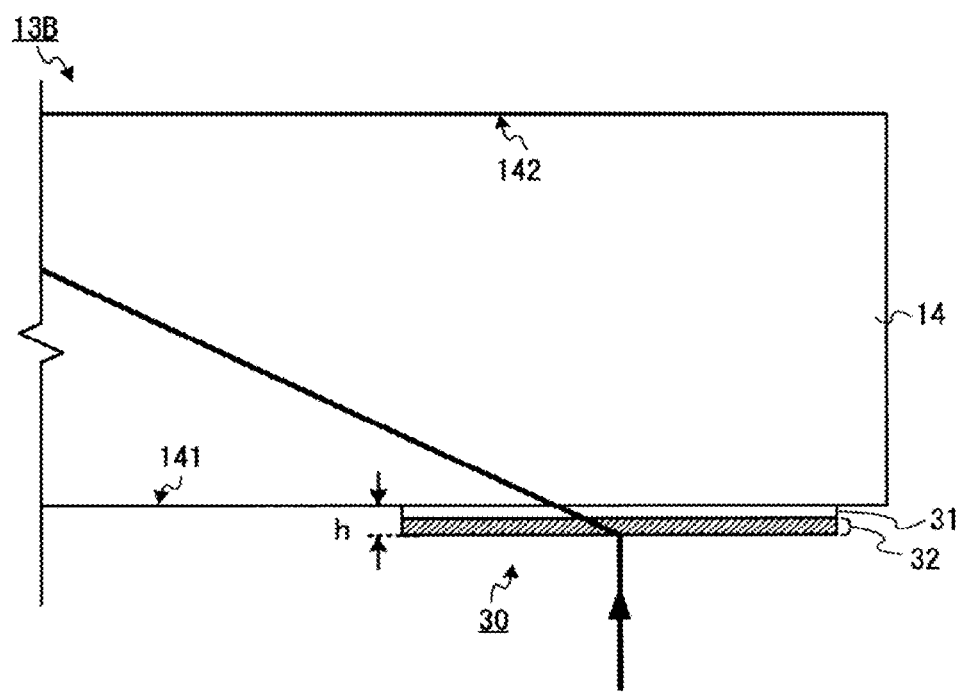
FIG. 3 is a view showing the configuration of another configuration example (light guide element 13B) of the light guide element 13.

FIG. 3 is a view showing the configuration of another configuration example (light guide element 13B) of the light guide element 13. The light guide element 13B shown in FIG. 3 is an example in which at least one diffraction part has been formed using a volume holographic element 30 which has a functional layer 32 that exerts a diffractive action. The light guide element 13B shown in FIG. 3 includes a light-guiding substrate 14 and at least one volume holographic element 30. Although the example shown in FIG. 3 is one which includes a volume holographic element 30 as a diffraction part for incidence 15, this light guide element 13B may further include another volume holographic element (not shown) as a diffraction part for emission 16, for example, at another position on the first optical surface 141 of the light-guiding substrate 14 or at another position on the second optical surface 142.

The volume holographic element 30 is formed on a surface of the light-guiding substrate 14. The functional layer 32 is a layer which is generally called hologram. More specifically, the functional layer 32 is a photosensitive-material layer in which interference fringes made up of optically light and dark regions generated within a photosensitive material as a result of interference between reference light and signal light have been recorded as a diffraction grating based on refractive-index modulation. The functional layer 32 is not particularly limited so long as a refractive-index modulation has been formed therein by interference between reference light and signal light so that the layer can exert a diffractive action.

In FIG. 3 is shown an example in which a base material 31 has been formed on a light-guiding substrate 14 and a functional layer 32 has been formed thereon. However, the base material 31 and the functional layer 32 may be the same member, that is, the functional layer 32 may be some of the base material 31. Furthermore, the base material 31 may be omitted by configuring the light-guiding substrate 14 so as to serve also as a base material 31. From the standpoint of enabling the thermal expansion of the functional layer 32 to be easily governed by the light-guiding substrate 14, it is preferable that the base material 31 should be a thin film substrate or be the same member as the functional layer 32 or should be omitted.

In the case where a volume holographic element 30 is used as a diffraction part, the distance h described above is the distance between the light-guiding substrate 14 and the surface of the functional layer 32 of this volume holographic element 30. As in the case of the diffractive optical element 20, the distance h is preferably equal to or less than 10%, more preferably equal to or less than 5%, of the thickness of the light-guiding substrate 14. By thus configuring the light guide element, the thermal expansion of the functional layer 32 can be made equal to the thermal expansion of the light-guiding substrate 14. This is because so long as the distance h is sufficiently short as compared with the thickness of the light-guiding substrate 14, the thermal expansion of the light-guiding substrate 14 due to temperature changes is thought to be a factor which governs the thermal expansion of the functional layer 32. Meanwhile, there are generally cases where too small heights of the functional layer 32 result in a decrease in diffractive action. The height of the functional layer 32 hence is preferably 50 nm or larger, more preferably 100 nm or larger. Consequently, the distance (height) h also is preferably 50 nm or longer, more preferably 100 nm or longer.

An adhesive member, e.g., an adhesive, and an optical element having another optical function, e.g., a wave plate, may have been interposed between the light-guiding substrate 14 and the volume holographic element 30, specifically, between the light-guiding substrate 14 and the base material 31 or between the light-guiding substrate 14 and the functional layer 32. In such cases also, it is preferable that the distance h should satisfy the requirement described above.

In the case where a volume holographic element 30 is used as a diffraction part for incidence 15, it is necessary, for utilizing total reflection in the light-guiding substrate 14, that this volume holographic element 30 should deflect light at a large angle. From this standpoint, it is preferable that the pitch, i.e., the interval between high-refractive-index portions in the refractive-index modulation, in the functional layer 32 should be not longer than the wavelength of the light which enters the volume holographic element 30. Also in the case where a volume holographic element 30 is used as a diffraction part for emission 16 and where it is necessary that the incident light which has been propagated through the light-guiding substrate 14 while undergoing total reflection therein should be deflected at a large angle in order to guide the light along a given optical path, it is preferable that the pitch of the functional layer 32 of the volume holographic element 30 as the diffraction part for emission 16 should be not longer than the wavelength of the light which enters the volume holographic element 30.

In each volume holographic element 30, the material, thickness, pitch, etc. of the functional layer 32 are regulated in accordance with the diffractive action which is desired to be exerted. In the case where a plurality of volume holographic elements 30 is included, the distance h in each of all the volume holographic elements 30 is preferably equal to or less than 10%, more preferably equal to or less than 5%, of the thickness of the light-guiding substrate 14. Furthermore, the distance (height) h also is preferably 50 nm or longer, more preferably 100 nm or longer.

In the case of using a glass substrate as the light-guiding substrate 14, a surface treatment with a silane coupling agent or the like may be given to the interface between the light-guiding substrate 14 and either the diffractive optical element 20 or the volume holographic element 30 or between the light-guiding substrate 14 and an adhesive member for bonding these, in order to render the thermal expansion of the light-guiding substrate 14 more dominant. In this case, use may be made of a method in which a buffer layer is formed from a material capable of film formation, e.g., $SiO_2$, on the light-guiding substrate 14 that is a glass substrate and a surface treatment with a silane coupling agent or the like is given to the buffer layer. By the disposition of the buffer layer, the state of OH groups which combine with the silane coupling agent can be rendered even and the adhesion can be stabilized.

In the case of using a glass substrate, it is preferred to use a glass substrate in which both surfaces have been polished. In a case where such a glass substrate in which both surfaces have been polished is used, the degree of parallelization of the substrate can be low and the surface roughness thereof can also be low. Furthermore, by reducing the degree of parallelization of the substrate, the strain of the optical path along which a ray of light passes can be reduced. The value of the degree of parallelization is preferably 5 μm or less. Meanwhile, by reducing the surface roughness, the haze can be reduced. The surface roughness is preferably 10 nm or less, more preferably 1 nm or less, in terms of the value of Ra. "Ra" means the arithmetic average roughness determined in accordance with JIS-B0601:2013.

The light guide element 13 may have a protective layer disposed on the diffraction part. Alternatively, a cover may be disposed so as to cover the diffraction part. Thus, it is possible to protect the diffraction part, in particular, the concavo-convex layer 22 and the functional layer 32.

Figure 4A:
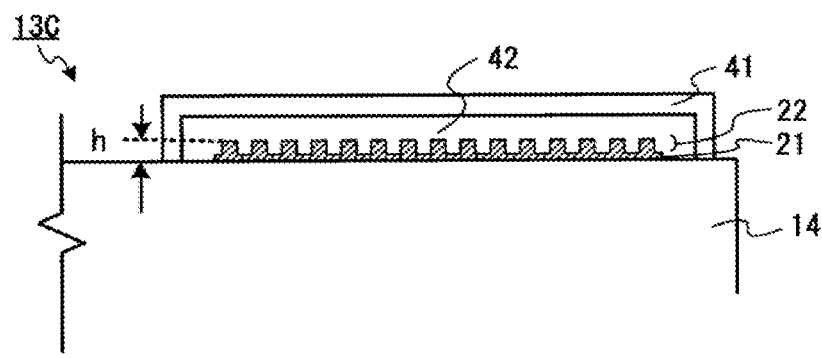
FIG. 4A and FIG. 4B are schematic views which show other examples (light guide element 13C and light guide element 13D) of the light guide element 13.

FIG. 4A is a view which illustrates an example (light guide element 13C) of the light guide element 13, the light guide element 13C being one in which a cover has been disposed so as to cover the concavo-convex layer 22 possessed by a diffraction part. The light guide element 13C shown in FIG. 4A is an example of the light guide element 13, in which the concavo-convex layer 22 is some of the member constituting the base material 21 and in which a cover 41 has been disposed so as to cover this concavo-convex layer 22. Reference numeral 42 denotes an air layer.

By covering the concavo-convex layer 22 with a cover 41 as shown in FIG. 4A, the concavo-convex layer 22 can be protected so that air remains as the medium surrounding the recesses of the diffraction grating in the concavo-convex layer 22. In a case where air is used as the medium surrounding the recesses of a diffraction grating, the diffraction grating thus produced can have a large difference in refractive index and the concavo-convex layer 22 therein can have a reduced thickness. This configuration is hence preferred. Also in the case where the cover 41 has been disposed, the distance h is the distance from the optical surface of the light-guiding substrate 14 on the side where the concavo-convex layer 22 has been formed to the tops of the protrusions of the concavo-convex layer 22.

Figure 4B:
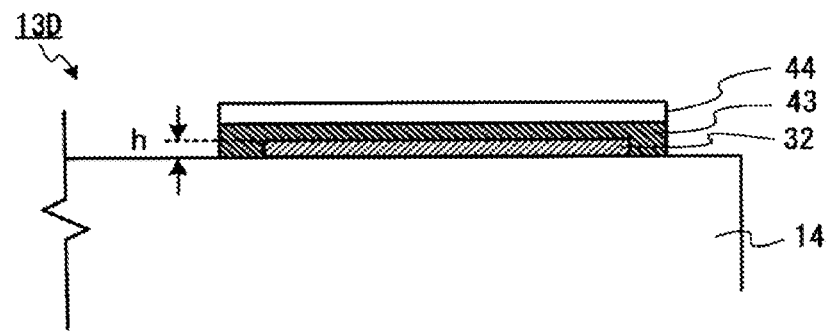

FIG. 4B is a view which illustrates an example (light guide element 13D) of the light guide element 13, the light guide element 13D being one in which protective layers have been disposed on the functional layer 32 possessed by a diffraction part. The light guide element 13D shown in FIG. 4B is an example of the light guide element 13, in which a hologram (functional layer 32) has been enclosed, together with an interlayer film 43 as a first protective layer, between the light-guiding substrate 14 and a substrate 44 which is a second protective layer. In this example, the light-guiding substrate 14 and the substrate 44 constitutes a laminated glass.

The interlayer film 43 is formed from, for example, poly(vinyl butyral) (PVB) or the like. This interlayer film enables the protective films not to affect the properties of the hologram. The functional layer 32 may be thus protected using a laminated glass and an interlayer film. Also in the configuration in which protective layers such as the interlayer film 43 and the substrate 44 have been disposed, the distance h is the distance from the optical surface of the light-guiding substrate 14 on the side where the functional layer 32 has been formed to the surface of the functional layer 32.

Next, an explanation is given on changes in diffraction direction with changing temperature. At a certain temperature T, incident light is diffracted by the diffraction part for incidence 15 and is propagated in an oblique direction in the light-guiding substrate 14. In a case where the incident light is assumed to enter the diffraction part for incidence 15 perpendicularly thereto and the diffracted light is assumed to be primary diffracted light, then the diffraction angle θ within the light-guiding substrate 14 at which the incident light is diffracted by the diffraction part for incidence 15 satisfies the following equation (1). In equation (1), λ is the wavelength of the light which enters the light guide element 13, P is the pitch of the diffraction grating of the diffraction part for incidence 15 (specifically, the pitch of the concavo-convex layer 22 or the pitch of the functional layer 32), and n is the refractive index of the light-guiding substrate 14 at the wavelength λ. In general, the pitch P varies depending on position. Namely, the pitch P is a function of position.

$$\sin \theta = \lambda/(nP) \qquad (1)$$

Figure 5A:
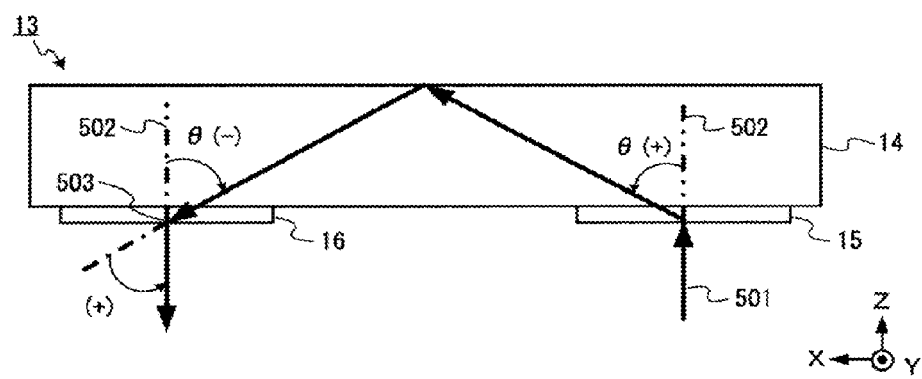
FIG. 5A and FIG. 5B are views for explaining diffraction angle θ.
Figure 5B:
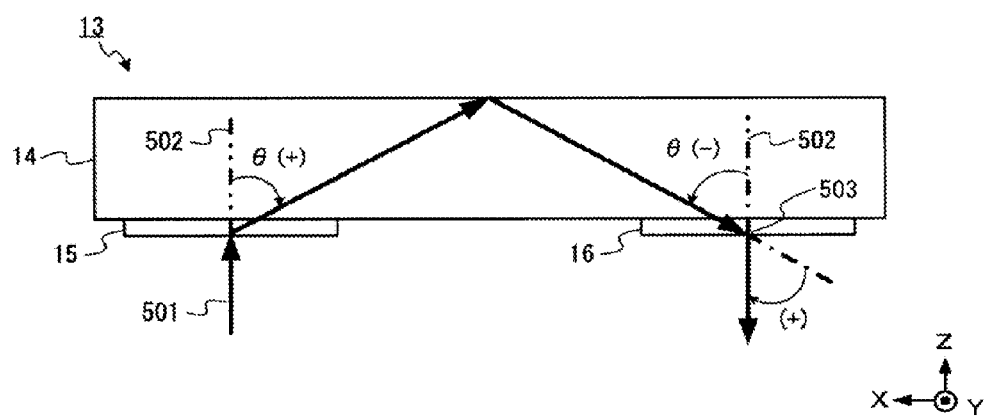

As shown in FIG. 5A and FIG. 5B, the diffraction angle θ in the present invention is defined as the angle formed by the direction 502 which is normal to the light-guiding substrate 14 and the diffracted light which has been emitted into the light-guiding substrate 14; the direction in which the diffracted light proceeds, i.e., the direction where the corresponding diffraction part for emission 16 is present, is taken as positive direction. Reference numeral 501 in the figures denotes incident light striking on the light guide element 13, while reference numeral 503 denotes the position of the center of the diffraction part for emission 16, said position being the position where the diffracted light emitted from the diffraction part for incidence 15 is emitted from the light guide element 13.

Next, the case where the temperature changes to T+ΔT is discussed. Upon the temperature change, the refractive index n of the light-guiding substrate 14 changes and the light-guiding substrate 14 expands thermally, resulting in a change in pitch P. In a case where the amount of the resultant change in the refractive index of the light-guiding substrate 14 is expressed by Δn, the amount of the resultant change in pitch is expressed by ΔP, and the amount of the resultant change in diffraction angle is expressed by Δθ (unit: [rad]), then Δθ can be expressed using the flowing equation (2), which is derived from equation (1). When the secondary amounts are ignored, the following equation (3) can be derived from equation (2).

$$\sin(\theta'\Delta\theta) = \lambda/\{(n+\Delta n)(P+\Delta P)\} \qquad (2)$$

$$\Delta\theta = -\tan\theta \times (\alpha + \beta/n)\Delta T \qquad (3)$$

In equation (3), β (unit: [1/° C.]) is the temperature coefficient of the refractive index of the light-guiding substrate 14 and is a numeral represented by β=dn/dT. Meanwhile, α (unit: [1/° C.]) is the coefficient of linear expansion of the light-guiding substrate 14. For deriving equation (3), use was made of ΔP=PαΔT. This is because since the distance h in the light guide element 13 used in this embodiment is sufficiently short as described above, the thermal expansion of the concavo-convex layer 22 or functional layer 32 due to the temperature change is thought to be governed by the thermal expansion of the light-guiding substrate 14.

It can be seen from equation (3) that the change in diffraction angle direction due to a temperature change can be reduced by making the value of |α+β/n| smaller.

Figure 6A:
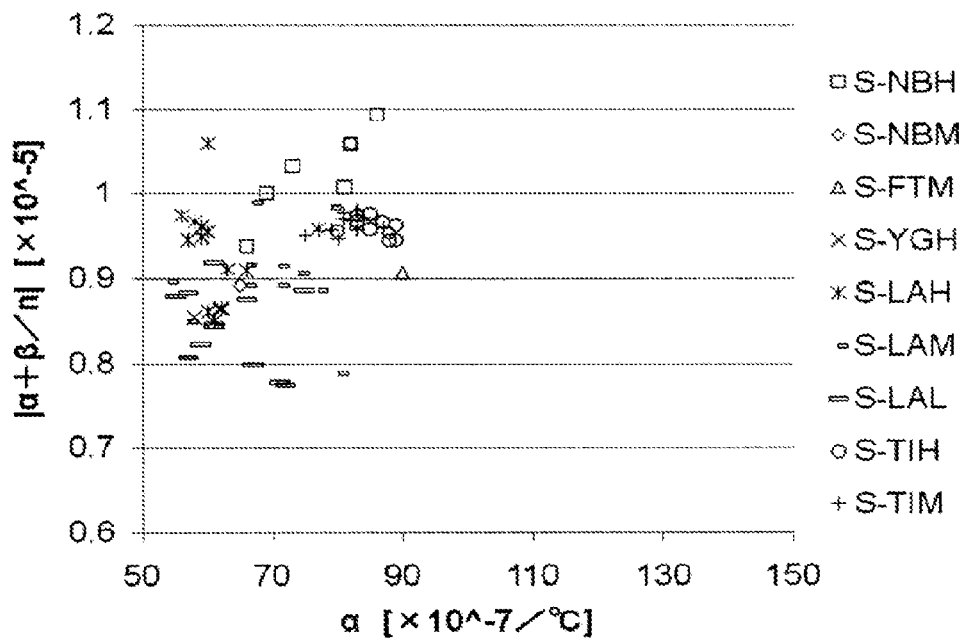
FIG. 6A and FIG. 6B are graphs which show relationships between the coefficient of linear expansion α and the value of $|\alpha+\beta/n|$ in several optical glasses currently on the market.
Figure 6B:
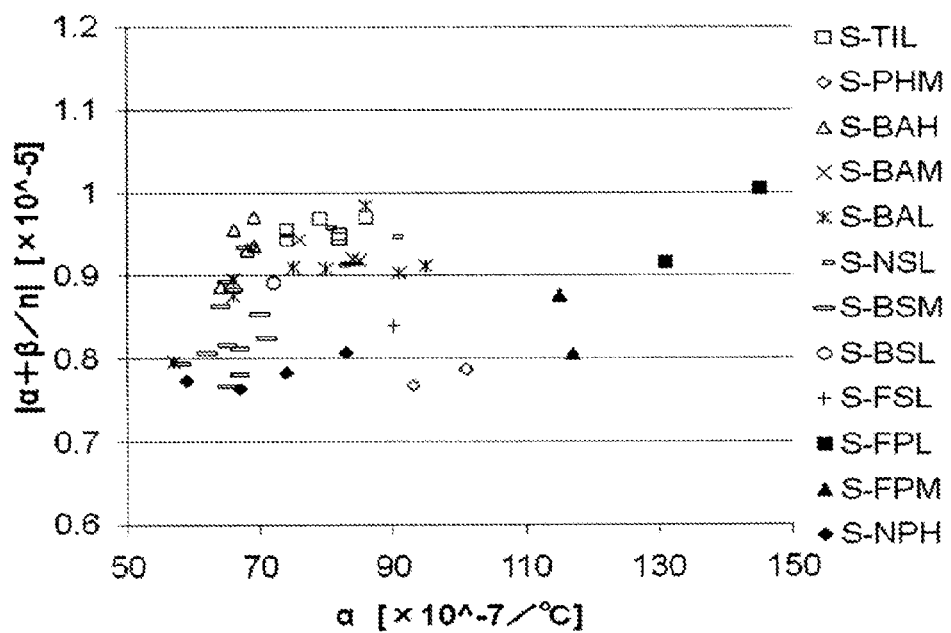

FIG. 6A and FIG. 6B are graphs which show relationships between the coefficient of linear expansion α and the value of |α+β/n| in several optical glasses currently on the market. The data on optical glasses were cited from the optical-glass data shown in optical-glass catalogues distributed by OHARA Inc. In the graphs of FIG. 6A and FIG. 6B, the labels have been sorted on the basis of the compositions of the optical glasses.

It can be seen from the graphs shown in FIG. 6A and FIG. 6B that the values of |α+β/n| of the optical glasses are distributed in the range of $7 \times 10^{-6}$ to $11 \times 10^{-6}$.

For reference, the values of |α+β/n| of representative resins are shown below. In the case of a polycarbonate: refractive index, n=1.59; temperature coefficient of refractive index, β=$-11.5 \times 10^{-5}$; coefficient of linear expansion, α=$6.7 \times 10^{-5}$; and hence |α+β/n|=$5.7 \times 10^{-6}$. In the case of polystyrene: refractive index, n=1.60; temperature coefficient of refractive index, β=$-13 \times 10^{-5}$; coefficient of linear expansion, α=$7 \times 10^{-5}$; and hence |α+β/n|=$11.3 \times 10^{-6}$. In the case of poly(methyl methacrylate): refractive index, n=1.49; temperature coefficient of refractive index, β=$-9.75 \times 10^{-5}$; coefficient of linear expansion, α=$4.3 \times 10^{-5}$; and hence |α+β/n|=$22.1 \times 10^{-6}$.

From the standpoint of diminishing changes in diffraction angle direction, smaller values of |α+β/n| are preferred. Consequently, in the case of using a glass as the light-guiding substrate 14, an optical glass in which the value of |α+β/n| is $9 \times 10^{-6}$ or less is preferred. More preferred is an optical glass in which the value of |α+β/n| is $8 \times 10^{-6}$ or less.

Next, influences of the thermal expansion of the light-guiding substrate 14 are explained. In a case where the light-guiding substrate 14 thermally expands due to a temperature change, the position of the diffraction part for emission 16 also shifts. Here, a ray of light which is diffracted at a constant angle θ and emitted from the diffraction part for incidence 15 and which enters the center 503 of the diffraction part for emission 16 is discussed. In a case where the diffraction part for emission 16 undergoes a shift due to the thermal expansion of the light-guiding substrate 14, the position at which the ray of light enters the diffraction part for emission 16 also shifts from the center 503. Especially in such cases where the diffraction part for emission 16 has the function of a lens, such a shift results in a shift of the optical axis to cause aberration. As a result, deterioration in image quality or a distortion of images occurs. Consequently, in a case where property changes due to temperature changes are taken into account, it is necessary to determine the amount of overall shifts of the ray of light, which are caused by not only the change in the pitch of the diffraction part for incidence 15 and the change in the refractive index of the light-guiding substrate 14 but also the shift of the diffraction part for emission 16.

Figure 7A:
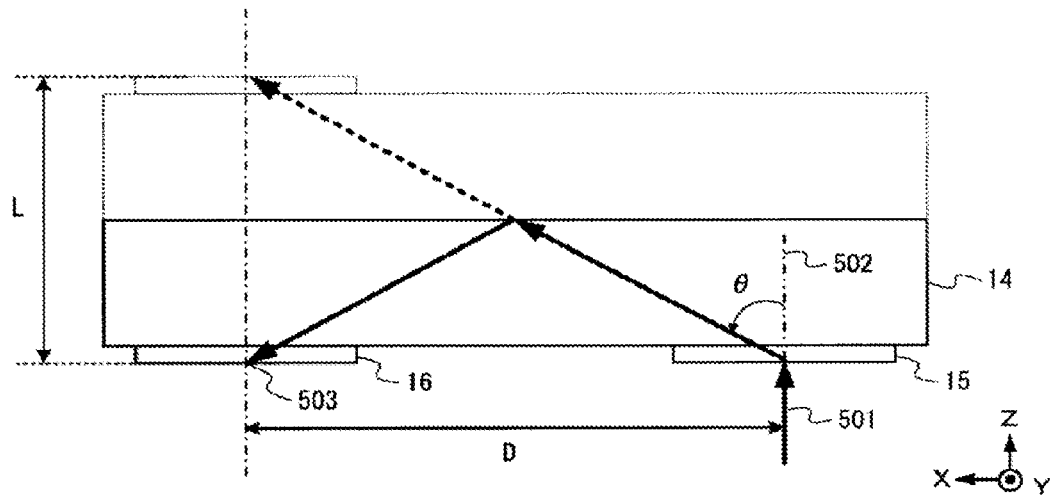
FIG. 7A and FIG. 7B are views for explaining the amount of a horizontal-direction movement (distance) D and the amount of a vertical-direction movement L.
Figure 7B:
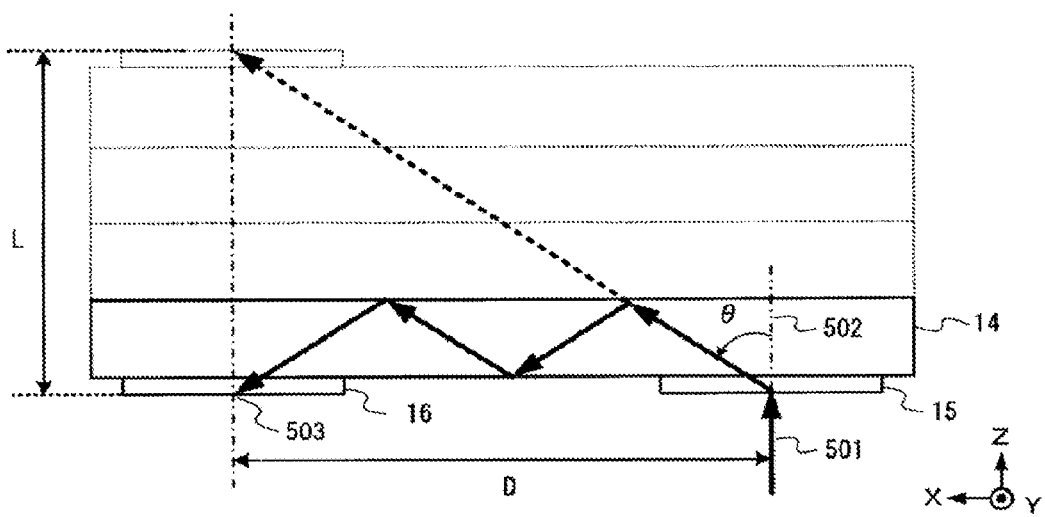

As shown in FIG. 7A and FIG. 7B, the amount in which a ray of light is propagated in the light guide element 13 at a temperature T in the direction parallel with the light-guiding substrate 14 (X-axis direction in the figures), that is, the amount of traveling (distance), is hereinafter expressed by D and the amount in which the ray of light is propagated in the direction perpendicular to the light-guiding substrate 14 (Z-axis direction in the figures), that is, the amount of traveling, is hereinafter expressed by L. D may be taken as the distance, at the temperature T, from the center of the diffraction part for incidence 15 to the center of the diffraction part for emission 16 or taken as the horizontal-direction distance, at the temperature T, from the center of the diffraction part for incidence 15 to the position which has been predetermined as the position where the diffracted light emitted from the diffraction part for incidence 15 is emitted from the light-guiding substrate 14. In each of FIG. 7A and FIG. 7B, mirror images of the light-guiding substrate 14 and diffraction part for emission 16 are shown by dotted lines. D, L, and θ satisfy the relationship D=L tan θ, as shown in FIG. 7A and FIG. 7B.

Figure 8:
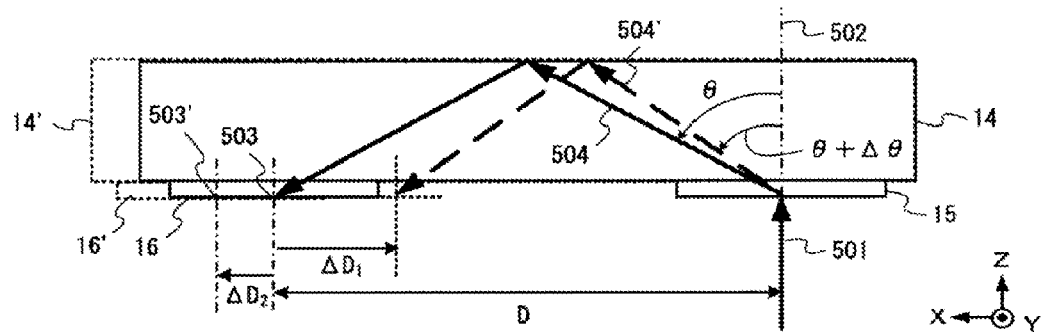
FIG. 8 is a view for explaining examples of the amounts of horizontal-direction shifts $\Delta D_1$ and $\Delta D_2$.

FIG. 8 is a view for explaining examples of the amounts of horizontal-direction shifts $\Delta D_1$ and $\Delta D_2$. $\Delta D_1$ represents, of the amounts of horizontal-direction shifts which accompany a temperature change, the amount of a shift, due to a change in diffraction direction, of the position where the light ray enters the diffraction part for emission 16. The direction along which D increases is defined as positive direction. This is because the values of symbols have been regulated to positive or negative values so that these values are negative when Δθ has changed to a negative value. FIG. 8 shows an example in which $\Delta D_1$ is negative. Meanwhile, $\Delta D_2$ represents, of the amounts of horizontal-direction shifts which accompany a temperature change, the amount of a shift, due to a change in the position of the diffraction part for emission 16, of the position where the light ray enters the diffraction part for emission 16. The direction along which D increases is defined as positive direction. This is because the values of symbols have been regulated to positive or negative values so that these values are positive when ΔT has changed to a positive value. FIG. 8 shows an example in which $\Delta D_2$ is positive. Although not shown in the figure, in the ΔL, the positive direction along the Z-axis direction is taken as positive. In FIG. 8, reference numeral 504 denotes the optical path along which the diffracted light is propagated at the temperature T. The primes attached to reference numerals each mean that the reference numeral indicates the component or member located after the temperature has changed by ΔT.

In a case where the pitch and the refractive index of the light-guiding substrate 14 change due to a temperature change, the diffraction direction changes, and the position where the diffracted light 504' from the diffraction part for incidence 15 strikes is represented by the following equation (4) in terms of distance from the incidence position.

$$D+\Delta D_1=(L+\Delta L)\tan(\theta+\Delta\theta) \quad (4)$$

Consequently, the amount of a shift $\Delta D_1$ of the light ray position due to a change in diffraction direction due to a temperature change can be calculated using the following equation (5). For the calculation, use was made of $\Delta L=\alpha L\Delta T$.

$$\Delta D_1=-D/\cos^2\theta\times\{(\sin^2\theta)\alpha+\beta/n\}\Delta T \quad (5)$$

Meanwhile, the diffraction part for emission 16 shifts due to the thermal expansion of the light-guiding substrate 14 itself so that $D+\Delta D_2=D+D\alpha\Delta T$ (see symbol 16').

Consequently, the overall amount of a shift (shift amount) ΔD of the optical axis due to a temperature change is represented by the following equation (6).

$$\Delta D=\Delta D_2-\Delta D_1=D\Delta T/\cos^2\theta\times(\alpha+\beta/n) \quad (6)$$

In the case where ΔT was +30° C., the shift of the optical axis due to the temperature change can be inhibited from exerting any influence, so long as |ΔD| is 0.15 mm or less. Values of |ΔD| not larger than 0.1 mm are more preferred. To sum up, it is preferred to use, as the material of the light-guiding substrate 14, a material that has a refractive index n, coefficient of linear expansion α, and refractive-index temperature coefficient β which satisfy $|\Delta D|=|D\Delta T/\cos^2\theta\times(\alpha+\beta/n)|\leq 0.15$ mm. More preferred is a material which satisfies |ΔD|≤0.1 mm. Even more preferred is a material which satisfies |ΔD|≤0.05 mm.

In the case where a diffractive optical element 20 is used as each of the diffraction part for incidence 15 and diffraction part for emission 16, concavo-convex layers 22 may be formed on the light-guiding substrate 14 using, for example, a processing technique such as etching or imprinting. In this case, either a resin or a hybrid material constituted of a resin and fine inorganic particles may be used as the base materials 21 and the concavo-convex layers 22. The hybrid material constituted of a resin and fine inorganic particles is preferred because the refractive index thereof can be regulated in a wide range and the thermal expansion thereof can be reduced as compared with the resin material alone. Usable as the fine inorganic particles is zirconium oxide or the like. In the case of using the hybrid material, scattering is prone to occur and it is hence preferable that the fine inorganic particles should have a small particle diameter. The average particle diameter of the fine inorganic particles is preferably 25 μm or less. Furthermore, since a large difference in refractive index between the resin and the fine inorganic particles is prone to result in scattering, it is preferred to use a resin having a refractive index of 1.6 or higher. The term "average particle diameter" means a value of D50 measured by a Microtrac method (laser diffraction/scattering method).

Use of a glass substrate as the light-guiding substrate 14 is preferred because this substrate has a low coefficient of linear expansion and, hence, unintended thermal deformations, which are ones other than isotropic expansion due to temperature changes, can be diminished. In this case, the glass substrate, besides satisfying the requirement concerning |α+β/n| described above, has a coefficient of linear expansion of preferably $\alpha\leq 1\times 10^{-5}$, more preferably $\alpha\leq 0.7\times 10^{-5}$. By reducing the coefficient of linear expansion α, the shift of the emission position can be rendered smaller.

Use may be made of a light-guiding substrate 14 which, at the temperature T, has a refractive index in the range of 1.4≤n≤2.2. Although higher refractive indexes of the light-guiding substrate 14 are preferred from the standpoint that a larger viewing angle is brought about, materials having a high refractive index generally show a reduced transmittance. Consequently, the refractive index n of the light-guiding substrate 14 is preferably 1.5≤n≤2.0, more preferably 1.6≤n≤1.9. It is also preferable that the Abbe number ν thereof should be 30 or larger. The temperature T is supposed to be an average temperature of the environment where the image display device is used (for example, a temperature around room temperature, i.e., a temperature from about 10° C. to about 20° C.), but the temperature T is not limited thereto. Moreover, ΔT is not limited to +30° C. T and ΔT may be set in accordance with the environment where the product is to be used. In the case where the product is, for example, for domestic use, it is preferable that T+ΔT should include the range of 0 to 40° C. In the case where the product is, for example, for motor vehicles, it is preferable that T+ΔT should include the range of −10 to 50° C.

Next, the optical glasses shown in FIG. 6A and FIG. 6B are classified into the following four groups and discussed.

The optical glasses are classified into:

(A) a group including optical glasses satisfying $|\alpha+\beta/n|\leq 8\times 10^{-6}$;

(B) a group including optical glasses satisfying $8\times 10^{-6}<|\alpha+\beta/n|\leq 9\times 10^{-6}$ and $\alpha\leq 0.7\times 10^{-5}$;

(C) a group including optical glasses satisfying $8\times 10^{-6}<|\alpha+\beta/n|\leq 9\times 10^{-6}$ and $\alpha>0.7\times 10^{-5}$; and (D) optical glasses other than the above ones.

The material of the light-guiding substrate 14 preferably is any of glasses which belong to groups (A) to (C) according to the classification. Glasses belonging to group (B) are preferable to glasses belonging to group (C), and glasses belonging to group (A) are preferable to glasses belonging to group (B). Although some resin materials have a value of $|\alpha+\beta/n|$ of $8\times10^{-6}$ or less, such resin materials have a high coefficient of linear expansion α and, hence, result in an increase in the amount of position shift of the diffraction part for emission 16. Since smaller fluctuations in emission position are preferred, it is preferred to use glasses, which are lower than resins in the coefficient of linear expansion α.

Figure 9:
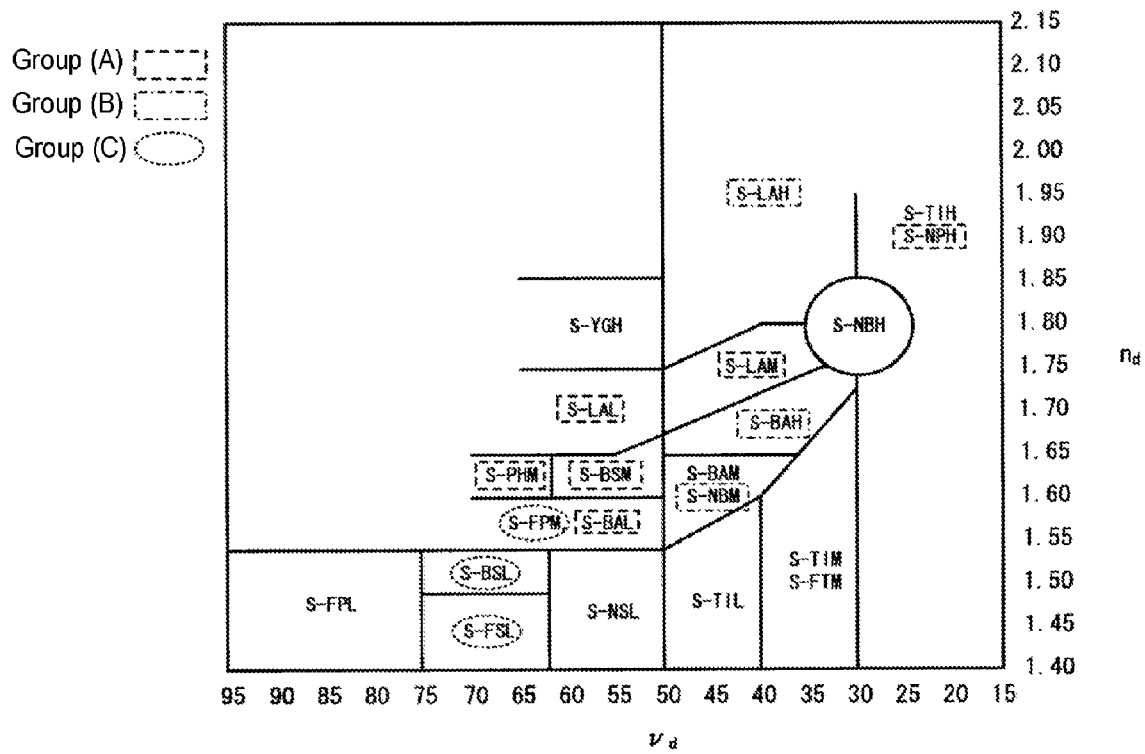
FIG. 9 is a graph which shows relationships between d-line refractive index $n_d$ and Abbe number $v_d$ at around room temperature, in the optical glasses shown in FIG. 6A and FIG. 6B.

Examples of the glasses belonging to group (A) include S-LAL, S-LAM, S-NPH, S-PHM, S-BSM, and S-BAL (all being trade names for optical glasses manufactured by OHARA Inc.). Examples of the glasses belonging to group (B) include S-LAH, S-NBM, and S-BAH (all being trade names for optical glasses manufactured by OHARA Inc.). Examples of the glasses belonging to group (C) include S-FSL, S-FPM, and S-BSL (all being trade names for optical glasses manufactured by OHARA Inc.). FIG. 9 is a chart ($n_d$-$v_d$ graph) which shows relationships between d-line refractive index $n_d$ and Abbe number $v_d$ at around room temperature in the optical glasses shown in FIG. 6A and FIG. 6B, which are among the optical glasses described in glass catalogues of OHARA Inc. The following Table 1 summarizes the distribution ranges, on the $n_d$-$v_d$ graph, of the glasses which belong to groups (A) to (C) and are surrounded by broken lines, dot-and-dash lines, and dotted lines in the graph of FIG. 9.

TABLE 1

| Group (A) | S-LAL | $1.65 \leq n_d \leq 1.75$ ($55 \leq v_d \leq 60$) |
| | | $-0.005v_d + 1.925 \leq n_d \leq 1.75$ ($50 \leq v_d \leq 55$) |
| | S-LAM | $1.75 \leq n_d \leq 1.80$ ($30 \leq v_d \leq 35$) |
| | | $-0.005v_d + 1.925 \leq n_d \leq 1.80$ ($35 \leq v_d \leq 40$) |
| | | $-0.005v_d + 1.925 \leq n_d \leq -0.005v_d + 2.00$ ($40 \leq v_d \leq 50$) |
| | S-NPH | $n_d \leq 30$ |
| | S-PHM | $1.60 \leq n_d \leq 1.65$ ($62 \leq v_d \leq 70$) |
| | S-BSM | $1.60 \leq n_d \leq 1.65$ ($55 \leq v_d \leq 62$) |
| | | $1.60 \leq n_d \leq -0.005vd + 1.925$ ($50 \leq v_d \leq 55$) |
| | S-BAL | $1.54 \leq n_d \leq 1.60$ ($v_d \leq 50$) |
| Group (B) | S-LAH | $-0.005v_d + 2.00 \leq n_d \leq 1.91$ ($40 \leq v_d \leq 50$) |
| | | $n_d \geq 1.80$ ($30 \leq v_d \leq 40$) |
| | | $n_d \geq 1.95$ ($26 \leq v_d \leq 30$) |
| | S-NBM | $1.65 \leq n_d \leq 1.91$ ($24 \leq v_d \leq 40$) |
| | S-BAH | $1.75 \leq n_d \leq -0.005v_d + 1.925$ ($36 \leq v_d \leq 50$) |
| | | $-0.01333v_d + 2.13 \leq n_d \leq -0.005v_d + 1.925$ ($35 \leq v_d \leq 36$) |
| | | $-0.01333v_d + 2.13 \leq n_d \leq 1.75$ ($30 \leq v_d \leq 35$) |
| Group (C) | S-FSL | $n_d \leq 1.49$ ($62 \leq v_d \leq 75$) |
| | S-FPM | $1.53 \leq n_d \leq 1.60$ ($67 \leq v_d \leq 75$) |
| | S-BSL | $1.49 \leq n_d \leq 1.54$ ($62 \leq v_d \leq 75$) |

Usable glasses are not limited to the products shown in Table 1, and a glass which satisfies any of the requirements concerning $n_d$ and $v_d$ shown in Table 1 may be used. The glasses belonging to groups (A) to (C) may have compositions having the following features.

Examples of glasses which belong to group (A) and which, in particular, have $n_d$ of 1.65 to 1.75 and $v_d$ of 35 to 60 (hereinafter referred to as group-A1 glasses) include glasses which contain the following components in the following amounts in terms of oxide amount in % by mass (hereinafter "% by mass" is abbreviated to "%").

$Ba_2O_3$: 15 to 40%
$La_2O_3$: 10 to 30%

In the group-A1 glasses, $B_2O_3$ is a component which forms a glass framework and heightens the stability of the glasses and which is capable of increasing the Abbe number. Inclusion of $B_2O_3$ in an amount of 15% or larger makes it possible to obtain desired large Abbe number $v_d$. By regulating the content of $B_2O_3$ to 40% or less, the refractive index is prevented from becoming too low and the occurrence of phase separation in the glasses can be prevented.

In the group-A1 glasses, $La_2O_3$ is capable of increasing the Abbe number while heightening the refractive index. $La_2O_3$ hence is a component useful for obtaining glasses having a high refractive index and showing low dispersion. By incorporating $La_2O_3$ in an amount of 10% or larger, a desired high refractive index and a desired large Abbe number are obtained. Meanwhile, by regulating the content of $La_2O_3$ to 30% or less, the liquidus temperature can be prevented from becoming too high and the glasses can be rendered less apt to suffer devitrification.

Examples of glasses which belong to group (A) and which, in particular, have $n_d$ of 1.54 to 1.75 and $v_d$ of 40 to 65 (hereinafter referred to as group-2A glasses) include glasses which contain the following components in the following amounts in terms of oxide amount in % by mass.

$B_2O_3$: 5 to 30%
$SiO_2$: 20 to 50%
BaO: 0.1 to 55%

In the group-A2 glasses, $B_2O_3$ is a component which forms a glass framework and heightens the stability of the glasses and which is capable of increasing the Abbe number. Inclusion of $B_2O_3$ in an amount of 5% or larger makes it possible to obtain desired large Abbe number $v_d$. By regulating the content of $B_2O_3$ to 30% or less, the refractive index is prevented from becoming too low and the occurrence of phase separation in the glasses can be prevented.

Like $B_2O_3$, $SiO_2$ in the group-A2 glasses is a component which forms a glass framework and heightens the stability of the glasses to enhance the devitrification resistance and which is capable of increasing the Abbe number. By regulating the content of $SiO_2$ to 50% or less, the refractive index can be inhibited from decreasing. Meanwhile, from the standpoints of lowering the liquidus temperature to inhibit devitrification and improving the chemical durability, it is preferable that $SiO_2$ should be contained in an amount of 20% or larger.

Furthermore, in the group-A2 glasses, BaO has the effect of heightening the refractive index of the glasses and the effect of enhancing the stability and chemical durability of the glasses. In case where the content of BaO is too low, there is the possibility of resulting in insufficient chemical durability. The content of BaO hence is preferably 0.1% or higher. Meanwhile, in case where the content of BaO is too high, the dispersing properties are increased, making it difficult to attain a decrease in dispersing property. Consequently, the content of BaO is preferably 55% or less.

Meanwhile, examples of the glasses which belong to group (B) and which, in particular, have $n_d$ of 1.65 to 1.91 and $v_d$ of 30 to 50 (hereinafter referred to as group-B1 glasses) include glasses which contain the following components in the following amounts in terms of oxide amount in % by mass.

$B_2O_3$: 10 to 25%
$La_2O_3$: 20 to 40%
ZnO: 3 to 24%

In the group-B1 glasses, $B_2O_3$ is a component which forms a glass framework and heightens the stability of the glasses and which is capable of increasing the Abbe number. Inclusion of $B_2O_3$ in an amount of 10% or larger makes it possible to obtain desired large Abbe number $v_d$. By regulating the content of $B_2O_3$ to 25% or less, the refractive index is prevented from becoming too low and the occurrence of phase separation in the glasses can be prevented.

In the group-B1 glasses, $La_2O_3$ is capable of increasing the Abbe number while heightening the refractive index. $La_2O_3$ hence is a component useful for obtaining glasses having a high refractive index and showing low dispersion. By incorporating $La_2O_3$ in an amount of 20% or larger, a desired high refractive index and a desired large Abbe number are obtained. Meanwhile, by regulating the content of $La_2O_3$ to 40% or less, the liquidus temperature can be prevented from becoming too high and the glasses can be rendered less apt to suffer devitrification.

In the group-B1 glasses, ZnO is a component which is capable of lowering the melting temperature and forming temperature of the glasses. Incorporation of ZnO in an amount of 3% or larger makes it possible to inhibit the melting temperature and forming temperature from becoming too high. Meanwhile, by regulating the content of ZnO to 24% or less, the refractive index and the Abbe number can be inhibited from decreasing.

Examples of the glasses which belong to group (C) and which, in particular, have $n_d$ of 1.53 to 1.6 and $v_d$ of 62 to 75 (hereinafter referred to as group-C1 glasses) include glasses which contain the following components in the following amounts in terms of oxide amount in % by mass.

$P_2O_5$: 20 to 50%
BaO: 10 to 55%

In the group-C1 glasses, $P_2O_5$ not only is a main component for glass formation (glass-forming oxide) but also is a component which heightens the viscosity of the glasses. In case where the content of $P_2O_5$ is too low, there is a possibility that the glasses might be unstable and have reduced viscosity. Consequently, the content of $P_2O_5$ is preferably 20% or higher. Meanwhile, too high $P_2O_5$ contents undesirably result in a decrease in refractive index. Consequently, the content of $P_2O_5$ is preferably 50% or less.

Furthermore, in the group-C1 glasses, BaO has the effect of heightening the refractive index of the glasses and the effect of enhancing the stability and chemical durability of the glasses. In case where the content of BaO is too low, there is the possibility of resulting in insufficient chemical durability. The content of BaO hence is preferably 10% or higher. In case where the content of BaO is too high, the dispersing properties are increased, making it difficult to attain a decrease in dispersing property. Consequently, the content of BaO is preferably 55% or less.

Meanwhile, examples of the glasses which belong to group (C) and which, in particular, have $n_d$ of 1.49 to 1.54 and $v_d$ of 62 to 75 (hereinafter referred to as group-C2 glasses) include glasses which contain the following components in the following amounts in terms of oxide amount in % by mass.

$B_2O_3$: 10 to 20%
$SiO_2$: 50 to 70%
$K_2O$: 5 to 25%

In the group-C2 glasses, $B_2O_3$ is a component which forms a glass framework and heightens the stability of the glasses and which is capable of increasing the Abbe number. Inclusion of $B_2O_3$ in an amount of 10% or larger makes it possible to obtain desired large Abbe number $v_d$. By regulating the content of $B_2O_3$ to 20% or less, the refractive index is prevented from becoming too low and the occurrence of phase separation in the glasses can be prevented.

Like $B_2O_3$, $SiO_2$ in the group-C2 glasses is a component which forms a glass framework and heightens the stability of the glasses to enhance the devitrification resistance and which is capable of increasing the Abbe number. By regulating the content of $SiO_2$ to 70% or less, the refractive index can be inhibited from decreasing. Meanwhile, from the standpoints of lowering the liquidus temperature to inhibit devitrification and improving the chemical durability, it is preferable that $SiO_2$ should be contained in an amount of 50% or larger.

Furthermore, in the group-C2 glasses, $K_2O$ is a component which is effective in lowering the liquidus temperature without causing the glasses to have impaired devitrification properties at around the softening points and in inhibiting the glasses from being colored by the reduction of Ti ions or Nb ions. $K_2O$ hence is an important essential component. From the standpoint of producing such effects, the content of $K_2O$ is preferably 5% or higher. Meanwhile, too high $K_2O$ contents undesirably result in a decrease in refractive index. Consequently, the content of $K_2O$ is preferably 25% or less.

Meanwhile, it is preferable that the difference in refractive index between the base material (base material 21 or base material 31) of each diffraction part or the layer (concavo-convex layer 22 or functional layer 32) which constitutes the diffraction grating and the light-guiding substrate 14 should be 0.5 or less. By thus regulating the refractive-index difference, internal reflection can be diminished and the occurrence of double images or the like can be inhibited.

In the case of using a glass as the material of the light-guiding substrate 14, a strengthening treatment such as chemical strengthening may be performed.

The image display device 10 may have a phase shifter such as a wave plate. The phase shifter can be disposed in an optical system, for example, before the diffraction part for incidence 15, within the light guide element 13, or after the diffraction part for emission 16. The disposition of a phase shifter makes it possible, for example, to change polarization for each of RGB colors of image light and thereby diminish interference between RGB colors due to, for example, the diffraction part for incidence 15. Conversely, it is possible to polarize the light so as to result in circularly polarized light, etc., thereby reducing brightness unevenness or the like due to reflectance changes which depend on polarization. As the phase shifter, use may be made of crystals such as quartz, stretched films, or the like. However, use of a polymeric liquid crystal is preferred because a reduction in film thickness can be attained therewith.

Figure 10A:
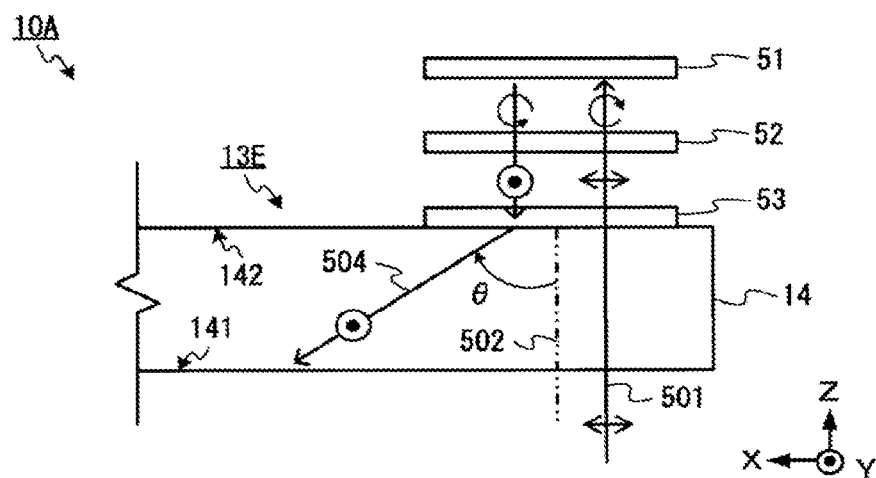
FIG. 10A and FIG. 10B are schematic views which show other examples (image display device 10A and image display device 10B) of the image display device 10.
Figure 10B:
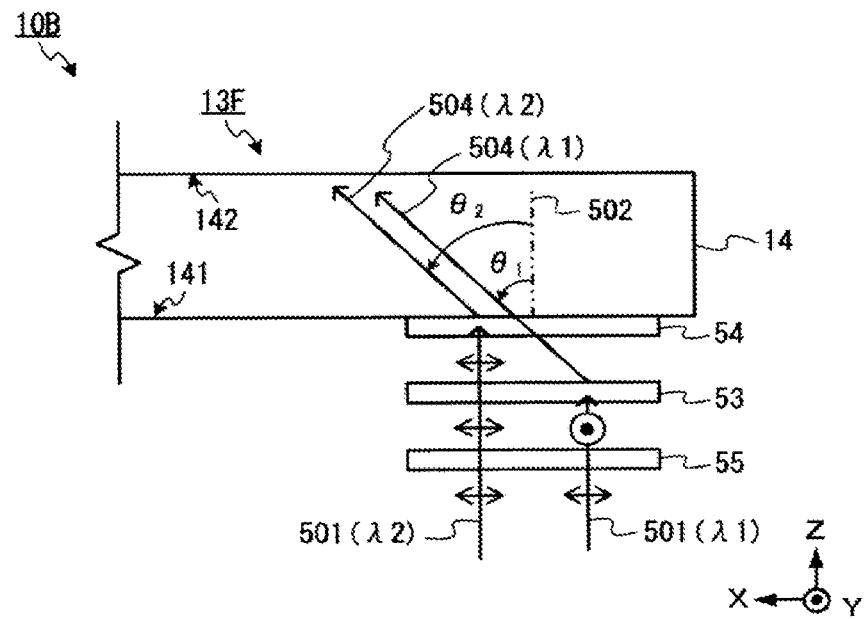

FIG. 10A and FIG. 10B are schematic views that show examples of the image display device 10 which include such phase shifters. The image display device 10A shown in FIG. 10A includes: a light guide element 13E having a diffraction part 53; a phase shifter 52 which functions as a ¼-wave plate; and an image light formation part 51.

The diffraction part 53 is a diffraction part for incidence which has a polarization dependence. In this example, the diffraction part 53 has been configured so that the diffraction part 53 does not exert a diffractive action on light polarized in a direction parallel with the plane of the drawing (X-axis direction in the figure) and exerts a diffractive action on light polarized in the direction perpendicular to the plane of the drawing (Y-axis direction in the figure).

The phase shifter 52 may be any phase shifter which functions as a ¼-wave plate.

In this image display device 10A as an example, first linearly polarized light, which is light polarized in a direction parallel with the plane of the drawing, is used as the incident light 501 which enters the light guide element 13E. This first linearly polarized light is not diffracted by the diffraction part 53 and passes therethrough. The first linearly polarized light which has passed through the diffraction part 53 enters the phase shifter 52 and is converted to circularly polarized light, which is emitted. The circularly polarized light which has been emitted from the phase shifter 52 enters the image light formation part 51. In the image light formation part 51, image light is superimposed on the circularly polarized light which has entered. The circularly polarized light on which the image light has been superimposed is emitted again from the incidence surface. The circularly polarized image light emitted from the image light formation part 51 enters the phase shifter 52 again and is converted this time into second linearly polarized light, which is light polarized in the direction perpendicular to the plane of the drawing, and emitted. The image light emitted as the second linearly polarized light from the phase shifter 52 is diffracted by the diffraction part 53 and is emitted as diffracted light 504 into the light-guiding substrate 14.

By thus using a diffraction part and a phase shifter in combination, the degree of freedom of disposing an image light formation part can be improved. The example shown in FIG. 10A is one in which the diffraction part 53, phase shifter 52, and image light formation part 51 have been disposed so as to be spaced from each other. However, the distance between the diffraction part 53 and the phase shifter 52 and the distance between the phase shifter 52 and the image light formation part 51 may be zero. Namely, these elements may have been bonded to each other.

Furthermore, in FIG. 10A, the optical path of the main light ray which is traveling from the diffraction part 53 toward the image light formation part 51 has been shown separately from the optical path of the main light ray which is traveling from the image light formation part 51 toward the diffraction part 53, for the purpose of an easy understanding of polarization directions. However, these optical paths usually coincide with each other, so long as the incident light enters the diffraction part 53 perpendicularly thereto.

Meanwhile, the image display device 10B shown in FIG. 10B includes: a diffraction part 53; a light guide element 13F having a diffraction part 54; and a phase shifter 55.

The diffraction part 53 is a first diffraction part for incidence which has a polarization dependence. In this example also, the diffraction part 53 has been configured so that the diffraction part 53 does not exert a diffractive action on light polarized in a direction parallel with the plane of the drawing (X-axis direction in the figure) and exerts a diffractive action on light polarized in the direction perpendicular to the plane of the drawing (Y-axis direction in the figure).

The diffraction part 54 is a second diffraction part for incidence which has polarization dependence. In this example, the diffraction part 54 has been configured so that the diffraction part 54 exerts a diffractive action on light polarized in a direction parallel with the plane of the drawing (X-axis direction in the figure) and does not exert a diffractive action on light polarized in the direction perpendicular to the plane of the drawing (Y-axis direction in the figure).

The phase shifter 55 is a phase shifter which functions as a wavelength-selective ½-wave plate. In this example, the phase shifter 55 has been configured so that the phase shifter 55 rotates the polarization direction of incident light 501 having a first wavelength (e.g., light having a wavelength $\lambda 1$) but does not rotate the polarization direction of incident light 501 having another wavelength (e.g., light having a wavelength $\lambda 2$).

In this image display device 10B as an example, light having two or more wavelengths is used as the incident light 501 which enters the light guide element 13F. The light having a first wavelength first enters the phase shifter 55 as first light linearly polarized in a direction parallel with the plane of the drawing. Upon the incidence of the light having a first wavelength on the phase shifter 55, the polarization direction thereof is rotated to give second light linearly polarized in the direction perpendicular to the plane of the drawing. This second linearly polarized light enters the diffraction part 53 as incident light 501($\lambda 1$). Since the incident light 501($\lambda 1$) is the second linearly polarized light, the incident light 501($\lambda 1$) is diffracted by the diffraction part 53 to become diffracted light 504($\lambda 1$), which enters the diffraction part 54. Since the diffracted light 504($\lambda 1$) which has entered the diffraction part 54 is the second linearly polarized light, this diffracted light 504($\lambda 1$) passes straight as such through the diffraction part 54, without being diffracted therein, and is then emitted into the light-guiding substrate 14.

Like the light having a first wavelength, light having a second wavelength also first enters the phase shifter 55 as first light linearly polarized in a direction parallel with the plane of the drawing. After the incidence on the phase shifter 55, the light having a second wavelength passes as such through the phase shifter 55, without undergoing rotation of the polarization direction, and enters the diffraction part 53 as incident light 501($\lambda 2$). Since the incident light 501($\lambda 2$) is the first linearly polarized light, the incident light 501($\lambda 2$) passes as such through the diffraction part 53, without being diffracted in the diffraction part 53, and enters the diffraction part 54. Since the incident light 501($\lambda 2$) which has entered the diffraction part 54 is the first linearly polarized light, this incident light 501($\lambda 2$) is diffracted by the diffraction part 54 to become diffracted light 504($\lambda 2$), which is emitted into the light-guiding substrate 14. In FIG. 10B, the angle at which the light having a first wavelength is diffracted by the diffraction part 53 is expressed by $\theta_1$, and the angle at which the light having a second wavelength is diffracted by the diffraction part 53 is expressed by $\theta_2$. The values of $\theta_1$ and $\theta_2$ may be the same or different.

By thus disposing the components, the generation of unintended diffracted light form light having different wavelengths can be inhibited. The example shown in FIG. 10B is one in which the phase shifter 55, diffraction part 53, and diffraction part 54 have been disposed so as to be spaced from each other. However, the distance between the phase shifter 55 and the diffraction part 53 and the distance between the diffraction part 53 and the diffraction part 54 may be zero. Namely, these elements may have been bonded to each other.

In FIG. 10B also, the positions of the main light rays which are striking on the phase shifter 55 have been shown separately from each other, for the purpose of an easy understanding of polarization directions. However, the positions thereof usually coincide with each other.

The phase shifter including the image display device 10 is not limited to one which is constituted of a single polymeric liquid crystal, and the phase shifter may be one composed of a plurality of polymeric-liquid-crystal layers which have been stacked. Thus, the phase shifter can be configured so as to have wavelength selectivity. Use may also be made of liquid crystals such as TN liquid crystals and cholesteric liquid crystals.

Furthermore, the configurations of the image display devices 10, 10A, and 10B shown above are applicable not only to HMDs but also to head-up display devices provided to motor vehicles or the like and ordinary display devices. Moreover, the configurations thereof can be applied also to stereoscopic display devices for displaying three-dimensional images.

EXAMPLES

Examples of the light guide element 13 are shown below in which specific numerical values, etc. are used.

Example 1

This Example is an example of the light guide element 13 shown in FIG. 1, and is one in which the diffraction part for incidence 15 and diffraction part for emission 16 that have been mounted are each a volume holographic element 30.

First, optical glass S-LAL54 (manufactured by OHARA Inc.) is polished and cut to produce a glass substrate of 50 mm×30 mm×1 mm for use as a light-guiding substrate 14 in this Example. S-LAL54 is an optical glass which belongs to group (A) (more specifically, a group-A1 glass) and has a d-line refractive index $n_d$ of 1.65, a refractive-index temperature coefficient $\beta$ of $1.1 \times 10^{-6}$, and a coefficient of linear expansion $\alpha$ of $7.1 \times 10^{-6}$ at around 10° C. From these values, $|\alpha+\beta/n|$ is calculated at $0.777 \times 10^{-5}$.

A volume hologram having a thickness of 25 µm is deposited, on the light-guiding substrate 14 in this Example, as the functional layer 32 of each of the diffraction part for incidence 15 and diffraction part for emission 16. In this Example, the light-guiding substrate 14 serves also as the base material 31 of each of the diffraction part for incidence 15 and diffraction part for emission 16. Consequently, the distance h in each of the diffraction part for incidence 15 and diffraction part for emission 16 is the thickness of the functional layer 32, i.e., 25 µm.

In the functional layer 32 of the diffraction part for incidence 15 is recorded a hologram whereby light which enters at an incidence angle of 0° is deflected to a direction of +70° in the light-guiding substrate 14. Meanwhile, in the functional layer 32 of the diffraction part for emission 16 is recorded a hologram which has both the function of a lens and a deflecting function whereby light which has traveled from a −70° direction with respect to the direction normal to the light-guiding substrate 14 is deflected so as to be emitted from a give surface at an angle of 0° perpendicularly to the light-guiding substrate 14, the latter function in this Example being the function of deflecting the light by 70° in the positive direction in terms of the direction concerning the angle of diffraction of the light in the diffraction part for incidence 15.

On the assumption that temperature T=10° C., the center of the diffraction part for emission 16 is disposed so that a light ray which passes along the optical axis of the lens function attributable to the functional layer 32 of the diffraction part for emission 16 is propagated in the light-guiding substrate 14 to result in D=30 mm at 10° C.

According to this Example, the amount of a shift ΔD of the light ray in the case where the temperature has changed by +30° C. is 60 µm, which is sufficiently small. It can be seen that the occurrence of quality deteriorations due to property changes accompanying a temperature change can be inhibited by the simple configuration.

Example 2

This Example is another example of the light guide element 13 shown in FIG. 1, and is one in which the diffraction part for incidence 15 and diffraction part for emission 16 that have been mounted are each a volume holographic element 30.

First, optical glass S-BAL35 (manufactured by OHARA Inc.) is polished and cut to produce a glass substrate of 50 mm×30 mm×1 mm for use as a light-guiding substrate 14 in this Example. S-BAL35 is an optical glass which belongs to group (A) (more specifically, a group-A2 glass) and has a d-line refractive index $n_d$ of 1.59, a refractive-index temperature coefficient $\beta$ of $3.6 \times 10^{-6}$, and a coefficient of linear expansion $\alpha$ of $5.7 \times 10^{-6}$ at around 10° C. From these values, $|\alpha+\beta/n|$ is calculated at $0.797 \times 10^{-5}$.

A volume hologram having a thickness of 25 µm is deposited, on the light-guiding substrate 14 in this Example, as the functional layer 32 of each of the diffraction part for incidence 15 and diffraction part for emission 16. In this Example also, the light-guiding substrate 14 serves also as the base material 31 of each of the diffraction part for incidence 15 and diffraction part for emission 16. Consequently, the distance h in each of the diffraction part for incidence 15 and diffraction part for emission 16 is the thickness of the functional layer 32, i.e., 25 µm.

In the functional layer 32 of the diffraction part for incidence 15 is recorded a hologram whereby light which enters at an incidence angle of 0° is deflected to a direction of +65° in the light-guiding substrate 14. Meanwhile, in the functional layer 32 of the diffraction part for emission 16 is recorded a hologram which has both the function of a lens and a deflecting function whereby light which has traveled from a −65° direction with respect to the direction normal to the light-guiding substrate 14 is deflected so as to be emitted from a give surface at an angle of 0° perpendicularly to the light-guiding substrate 14, the latter function in this Example being the function of deflecting the light by 65° in the positive direction in terms of the direction concerning the angle of diffraction of the light in the diffraction part for incidence 15.

On the assumption that temperature T=10° C., the center of the diffraction part for emission 16 is disposed so that a light ray which passes along the optical axis of the lens function attributable to the functional layer 32 of the diffraction part for emission 16 is propagated in the light-guiding substrate 14 to result in D=30 mm at 10° C.

According to this Example, the amount of a shift ΔD of the light ray in the case where the temperature has changed by +30° C. is 40 µm, which is sufficiently small. It can be seen that the occurrence of quality deteriorations due to a temperature change can be inhibited by the simple configuration.

While the present invention has been described in detail and with reference to specific embodiments thereof, it will be apparent to one skilled in the art that various changes and modifications can be made therein without departing from the spirit and scope thereof.

This application is based on Japanese Patent Application 2014-032260, filed on Feb. 21, 2014, the contents of which are incorporated herein by reference.

INDUSTRIAL APPLICABILITY

The present invention provides: an optical element which includes a function whereby at least some of light that is deflected by the diffractive action of a diffraction part formed on a substrate and is then emitted into the substrate is guided along a given optical path; and an optical device including the optical element. The optical element and the optical device are suitable for use not only in light guide elements and image display devices but also in other applications.

DESCRIPTION OF REFERENCE NUMERALS AND SIGNS

10 Image display device
11, 51 Image light formation part

12 Lens
13, 13A to 13F Light guide element
14 Light-guiding substrate
141 First optical surface
142 Second optical surface
15, 53, 54 Diffraction part (diffraction part for incidence)
16 Diffraction part (diffraction part for emission)
17 Viewer
20 Diffractive optical element
21 Base material
22 Concavo-convex layer
30 Volume holographic element
31 Base material
32 Functional layer
41 Cover
42 Air layer
43 First protective layer (interlayer film)
44 Second protective layer (substrate)
52, 55 Phase shifter

The invention claimed is:

1. A light guide element comprising:
a light-guiding substrate; and
a diffraction part formed on a surface of the light-guiding substrate, wherein:
the diffraction part comprises an optical layer capable of diffracting light;
a distance from the light-guiding substrate to a surface of the optical layer is equal to or less than 10% of a thickness of the light-guiding substrate; and
$|\Delta D|$ of the light guide element is 0.15 mm or less, wherein $|\Delta D|$ is defined as $|\Delta D|=|D\Delta T/\cos^2\theta \times (\alpha+\beta/n)|$
wherein $\theta$ is an angle between a direction normal to the surface of the light-guiding substrate and a ray of light that is diffracted by the diffraction part and is propagated in the light-guiding substrate, T (° C.) is a temperature, D (mm) is a distance, at the temperature T, between the center of the diffraction part and a position where the ray of light comes out of the light-guiding substrate in a direction parallel to the surface of the light-guiding substrate, n is a refractive index of the light-guiding substrate at a wavelength of light used, $\alpha$ (1/° C.) is a coefficient of linear expansion of the light-guiding substrate, $\beta$ (1/° C.) is a temperature coefficient of the refractive index of the light-guiding substrate, and $\Delta T$ (° C.) is a temperature change.

2. The light guide element according to claim 1, wherein $|\Delta D|\leq 0.1$ mm is satisfied.

3. The light guide element according to claim 1, wherein $|\Delta D|\leq 0.05$ mm is satisfied.

4. A light guide element comprising:
a light-guiding substrate; and
a diffraction part formed on a surface of the light-guiding substrate, wherein:
the diffraction part comprises an optical layer capable of diffracting light;
a distance from the light-guiding substrate to a surface of the optical layer is equal to or less than 10% of a thickness of the light-guiding substrate;
the light-guiding substrate is a glass substrate; and
the light-guiding substrate satisfies
$|\alpha+\beta/n|\leq 9\times 10^{-6}$ (1/° C.)
wherein n is a refractive index of the light-guiding substrate at a wavelength of light used, $\alpha$ (1/° C.) is a coefficient of linear expansion of the light-guiding substrate, and $\beta$ (1/° C.) is a temperature coefficient of the refractive index of the light-guiding substrate.

5. The light guide element according to claim 1, wherein $\alpha \leq 0.7\times 10^{-6}$ (1/° C.) is further satisfied.

6. The light guide element according to claim 4, wherein $\alpha \leq 0.7\times 10^{-6}$ (1/° C.) is further satisfied.

7. The light guide element according to claim 1, wherein $|\alpha+\beta/n|\leq 8\times 10^{-6}$ (1/° C.) is satisfied.

8. The light guide element according to claim 4, wherein $|\alpha+\beta n|\leq 8\times 10^{-6}$ (1/° C.) is satisfied.

9. The light guide element according to claim 1, wherein $1.5\leq n\leq 2.0$ is further satisfied.

10. The light guide element according to claim 4, wherein $1.5\leq n\leq 2.0$ is further satisfied.

11. A light guide element comprising:
a light-guiding substrate; and
a diffraction part formed on a surface of the light-guiding substrate, wherein:
the diffraction part comprises an optical layer capable of diffracting light;
a distance from the light-guiding substrate to a surface of the optical layer is equal to or less than 10% of a thickness of the light-guiding substrate;
the light-guiding substrate is a glass substrate; and
when a refractive index for d-line of the light-guiding substrate at an average ambient temperature is expressed by $n_d$ and Abbe number for d-line of the light-guiding substrate at the average ambient temperature is expressed by $v_d$, wherein d-line has a wavelength of 587.56 nm,
the light-guiding substrate satisfies any of the requirements shown as the following group (A) or any of the requirements shown as the following group (B):

Group (A):

$1.65\leq n_d\leq 1.75$ (where $55\leq v_d\leq 60$), $-0.005v_d+1.925\leq n_d\leq 1.75$ (where $50\leq v_d\leq 55$), $1.75\leq n_d\leq 1.80$ (where $30\leq v_d\leq 35$), $-0.005v_d+1.925\leq n_d\leq 1.80$ (where $35\leq v_d\leq 40$), $-0.005v_d+1.925\leq n_d\leq -0.005v_d+2.00$ (where $40\leq v_d\leq 50$), $v_d\leq 30$, $1.60\leq n_d\leq 1.65$ (where $62\leq v_d\leq 70$), $1.60\leq n_d\leq 1.65$ (where $55\leq v_d\leq 62$), $1.60\leq n_d\leq -0.005v_d+1.925$ (where $50\leq v_d\leq 55$), $1.54\leq n_d\leq 1.60$ (where $v_d\leq 50$), Group (B):

$-0.005v_d+2.00\leq n_d$ (where $40\leq v_d\leq 50$), $n_d\geq 1.80$ (where $30\leq v_d\leq 40$), $n_d\geq 1.95$ (where $26\leq v_d\leq 30$), $1.65\leq n_d\leq 1.91$ (where $24\leq v_d\leq 40$), $1.75\leq n_d\leq -0.005v_d+1.925$ (where $36\leq v_d\leq 50$), $-0.01333v_d+2.13\leq n_d\leq -0.005v_d+1.925$ (where $35\leq v_d\leq 36$), $-0.01333v_d+2.13\leq n_d\leq 1.75$ (where $30\leq v_d\leq 35$).

12. The light guide element according to claim 11, wherein $v_d>30$ is further satisfied.

13. The light guide element according to claim 1, wherein the optical layer of the diffraction part has a polarization dependence,
the light guide element comprises a phase shifter comprising a polymeric liquid crystal, either on an optical path of light which enters the diffraction part or on an optical path of light which comes out of the diffraction part.

14. The light guide element according to claim 4, wherein the optical layer of the diffraction part has a polarization dependence,
the light guide element comprises a phase shifter comprising a polymeric liquid crystal, either on an optical path of light which enters the diffraction part or on an optical path of light which comes out of the diffraction part.

15. The light guide element according to claim 11 wherein the optical layer of the diffraction part has a polarization dependence,
the light guide element comprises a phase shifter comprising a polymeric liquid crystal, either on an optical path of light which enters the diffraction part or on an optical path of light which comes out of the diffraction part.

16. The light guide element according to claim 1, wherein the distance from the light-guiding substrate to the surface of the optical layer is 50 nm or longer.

17. The light guide element according to claim 4, wherein the distance from the light-guiding substrate to the surface of the optical layer is 50 nm or longer.

18. An image display device comprising the light guide element according to claim 1.

19. An image display device comprising the light guide element according to claim 4.

20. An image display device comprising the light guide element according to claim 11.

* * * * *